United States Patent
Chai et al.

(10) Patent No.: US 9,580,897 B2
(45) Date of Patent: Feb. 28, 2017

(54) SYSTEM AND METHOD FOR PURIFYING RAINFALL RUNOFF

(71) Applicants: Chongqing University, Chongqing (CN); Promotion Centre of Science and Technology Development, Ministry of Housing and Urban-Rural Development of the People's Republic of China, Beijing (CN)

(72) Inventors: Hongxiang Chai, Chongqing (CN); Feng Zhang, Beijing (CN); Weijie Wang, Chongqing (CN); Yanrong Bao, Chongqing (CN); Boyu Zou, Chongqing (CN); Qiang Jiang, Chongqing (CN); Hua Zhao, Beijing (CN)

(73) Assignees: CHONGQING UNIVERSITY, ChongQing (CN); Promotion Centre of Science and Technology Development, Ministry of Housing and Urban-Rural Development of the People's Republic of China, Beijing (CN)

( * ) Notice: Subject to any disclaimer, the term of this patent is extended or adjusted under 35 U.S.C. 154(b) by 633 days.

(21) Appl. No.: 14/092,889

(22) Filed: Nov. 27, 2013

(65) Prior Publication Data

US 2014/0144850 A1 May 29, 2014

(30) Foreign Application Priority Data

Nov. 27, 2012 (CN) .......................... 2012 1 0489868

(51) Int. Cl.
*E03F 1/00* (2006.01)
*C02F 1/00* (2006.01)
(Continued)

(52) U.S. Cl.
CPC .............. *E03F 1/002* (2013.01); *C02F 1/004* (2013.01); *C02F 3/046* (2013.01);
(Continued)

(58) Field of Classification Search
CPC ......... E03F 1/002; E03F 5/14; E03F 2201/10; C02F 1/004; C02F 3/046; C02F 2103/001;
(Continued)

(56) References Cited

U.S. PATENT DOCUMENTS 4,094,790 A * 6/1978 Schmidt, Jr. ........... B01D 23/18
210/289
5,437,786 A * 8/1995 Horsley .................. C02F 3/046
210/170.03
(Continued)

FOREIGN PATENT DOCUMENTS

CN 202030616 U * 11/2011
CN 102531282 A * 7/2012

OTHER PUBLICATIONS

English Abstract for CN 202030616 U to Huang et al, Nov. 2011, Derwent Acc. No. 2011-P95276, three pages.*
(Continued)

*Primary Examiner* — Matthew O Savage
(74) *Attorney, Agent, or Firm* — Matthias Scholl P.C.; Matthias Scholl

(57) ABSTRACT

A system for purifying rainfall runoff including a bar screen; a collection and diversion device; a filter channel; a grass ditch; and a water storage tank. The bar screen is disposed around the collection and diversion device for preliminarily filtering the road rainfall runoff. The collection and diversion device collects the road rainfall runoff and diverts early rainfall runoff to the filter channel, after the filter channel is full, later rainfall runoff is directly diverted to the grass ditch
(Continued)

through open channels. The grass ditch includes a percolation bed capable of filtering the early and later rainfall runoff. The water storage tank is connected to the grass ditch via a guiding pipe, to receive the rainfall runoff effusing out of the grass ditch. Part of the rainfall runoff received by the water storage is transported to the percolation bed by a return conduit.

7 Claims, 3 Drawing Sheets

(51) Int. Cl.
  *C02F 3/04* (2006.01)
  *E03F 5/14* (2006.01)
  *C02F 103/00* (2006.01)

(52) U.S. Cl.
  CPC .. *C02F 2103/001* (2013.01); *C02F 2301/043* (2013.01); *C02F 2303/24* (2013.01); *E03F 5/14* (2013.01); *Y02W 10/15* (2015.05)

(58) Field of Classification Search
  CPC .......... C02F 2301/043; C02F 2303/24; Y02W 10/15
  USPC .......................................... 210/170.03, 747.2
  See application file for complete search history.

(56) References Cited

U.S. PATENT DOCUMENTS

| | | | | |
|---|---|---|---|---|
| 6,767,457 B2 * | 7/2004 | Perry, Jr. | ............... | B01D 24/105 |
| | | | | 210/196 |
| 2008/0251448 A1 * | 10/2008 | Kent | ....................... | C02F 3/306 |
| | | | | 210/602 |
| 2009/0261036 A1 * | 10/2009 | Lucas | .................... | C02F 1/004 |
| | | | | 210/602 |

OTHER PUBLICATIONS

English Abstract for CN 102531282 A to Chen et al, Jul. 2012, Derwent Acc. No. 2012-K55136, five pages.*

* cited by examiner

SYSTEM AND METHOD FOR PURIFYING RAINFALL RUNOFF

CROSS-REFERENCE TO RELATED APPLICATIONS

Pursuant to 35 U.S.C. §119 and the Paris Convention Treaty, this application claims the benefit of Chinese Patent Application No. 201210489868.3 filed Nov. 27, 2012, the contents of which are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a system and method for purifying road rainfall runoff.

2. Description of the Related Art

A typical system for purifying road runoff water is mainly focused on early rainstorm runoff that is heavily polluted. The early rainstorm runoff is separated from the later rainstorm runoff by diversion. Basic characteristics of urban runoff pollution include that a concentration of pollutant in the early runoff is higher than that in the later runoff, so that it is one of the main strategies for controlling the pollution in the urban rainfall runoff to intercept the early runoff. Concentrations of COD and suspended substances (SS) in the early rainstorm runoff of the urban road are higher than that in other underlying surfaces, so that urban roads are the main origin of suspended solids and organic pollutants compared to building roofs. This presents much opportunity for improvement in this technological area.

SUMMARY OF THE INVENTION

In view of the above-described problems, it is one objective of the invention to provide a system and a method for purifying road rainfall runoff that is capable of separating the highly polluted early rainfall runoff from the later rainfall runoff, and increasing an infiltration capacity of the rainwater in a percolation bed.

To achieve the above objective, in accordance with one embodiment of the invention, there is provided a system for purifying road runoff water comprising a bar screen; a collection and diversion device; a filter channel; a grass ditch; and a water storage tank. The bar screen is disposed around the collection and diversion device for preliminarily filtering the road rainfall runoff. The collection and diversion device collects the road rainfall runoff and diverts early rainfall runoff to the filter channel, after the filter channel is full, later rainfall runoff is directly diverted to the grass ditch through open channels. The grass ditch comprises a percolation bed capable of filtering the early and later rainfall runoff. The water storage tank is connected to the grass ditch via a guiding pipe, to receive the rainfall runoff effusing out of the grass ditch. Part of the rainfall runoff received by the water storage is transported to the percolation bed by a return conduit.

In a class of this embodiment, the filter channel comprises a precipitation region and a filtration region, a scale height of a bottom of the filter channel is equal to a scale height of a bottom of the grass ditch, and a slope of the filter channel is designed according to a terrain. The filtration region is divided into a plurality of sections filled with different matrix materials comprising crushed stone, coarse sand, and fine sand, respectively. The different matrix materials are separated by using gratings and geotextiles, and pollutants in the early rainfall runoff is intercepted and absorbed.

In a class of this embodiment, the grass ditch is reconstructed from a green area in a central road or a green area on a roadside, a length of the grass ditch is between 30 and 60 m. The grass ditch has a slope, a top of the scale length of the grass ditch is lower than that of the road; and soil on a bottom of the grass ditch is reconstructed to form the percolation bed.

In a class of this embodiment, the percolation bed has the slope of 2%, and comprises one or several natural matrix materials including but not limited to soil, crushed stone, fine gravel, pebbles, slag, geotextile, and coarse gravel.

In a class of this embodiment, the water storage tank is a permeation storage tank, and comprises: an overflow opening, a water outlet pipe, and a water inlet pipe. The overflow opening is arranged on a top of the water storage tank. The water outlet pipe is arranged at a position lower than the overflow opening. The water inlet pipe is arranged at a position close to a bottom of the water storage tank and is connected to the guiding pipe of the percolation bed; and a pebble layer is laid over the bottom of the water storage tank.

In a class of this embodiment, the guiding pipe is a perforated pipe wrapped by geotextile; a water inlet of the guiding pipe is provided with a filter mesh; and a scale height of a bottom of the guiding pipe is higher than that of the bottom of the water storage tank.

In accordance with one embodiment of the invention, there is provided a method for purifying road runoff water using a purification system, the purification system comprising a bar screen, a collection and diversion device, a filter channel, a grass ditch, and a water storage tank; the bar screen being disposed around the collection and diversion device for preliminarily filtering the road rainfall runoff; the collection and diversion device collecting the road rainfall runoff and diverting early rainfall runoff to the filter channel, after the filter channel being full, later rainfall runoff being directly diverted to the grass ditch through open channels; the grass ditch comprising a percolation bed capable of filtering the early and later rainfall runoff; and the water storage tank being connected to the grass ditch via a guiding pipe, to receive the rainfall runoff effusing out of the grass ditch; and the comprising: 1) filtering the road rainfall runoff by the bar screen; 2) collecting the road rainfall runoff by the collection and diversion device, diverting the early rainfall runoff to the filter channel until the filter channel is full and diverting later rainfall runoff directly to the grass ditch via the open channels; 3) treating the early rainfall runoff and the later rainfall runoff by the grass ditch; 4) allowing the rainfall runoff effusing out of the grass ditch to flow into the water storage tank via the guiding pipe; and 5) transporting part of the rainfall runoff received by the water storage to the percolation bed by a return conduit, and allowing the rest rainfall runoff to overflow to a next purification system.

Advantages of the invention are summarized as follows:

1. The heavily polluted early rainfall runoff is precipitated and filtered by the filter channel to decrease the concentration of the pollutants in the early rainfall runoff. The pollutants in the rainfall runoff are further decreased by treatment of the grass ditch, so that the quality of the rainfall runoff from the grass ditch is significantly improved. Meanwhile, the flow rate of the rainfall runoff in the grass ditch is decreased, whereby significantly reducing the erosion effect on the topsoil and the cover plants of the grass ditch.

2. The water storage tank collects the outflow of the rainfall runoff from the grass ditch, thereby realizing the regulation of the rainwater outflow. The relatively clean rainwater filtered by the grass ditch is mainly evenly distributed to the percolation bed, thereby enlarging the rainwater infiltration in the percolation bed and decreasing the volume of the water for road irrigation.

BRIEF DESCRIPTION OF THE DRAWINGS

The invention is described hereinbelow with reference to the accompanying drawings, in which.

Figure 1:
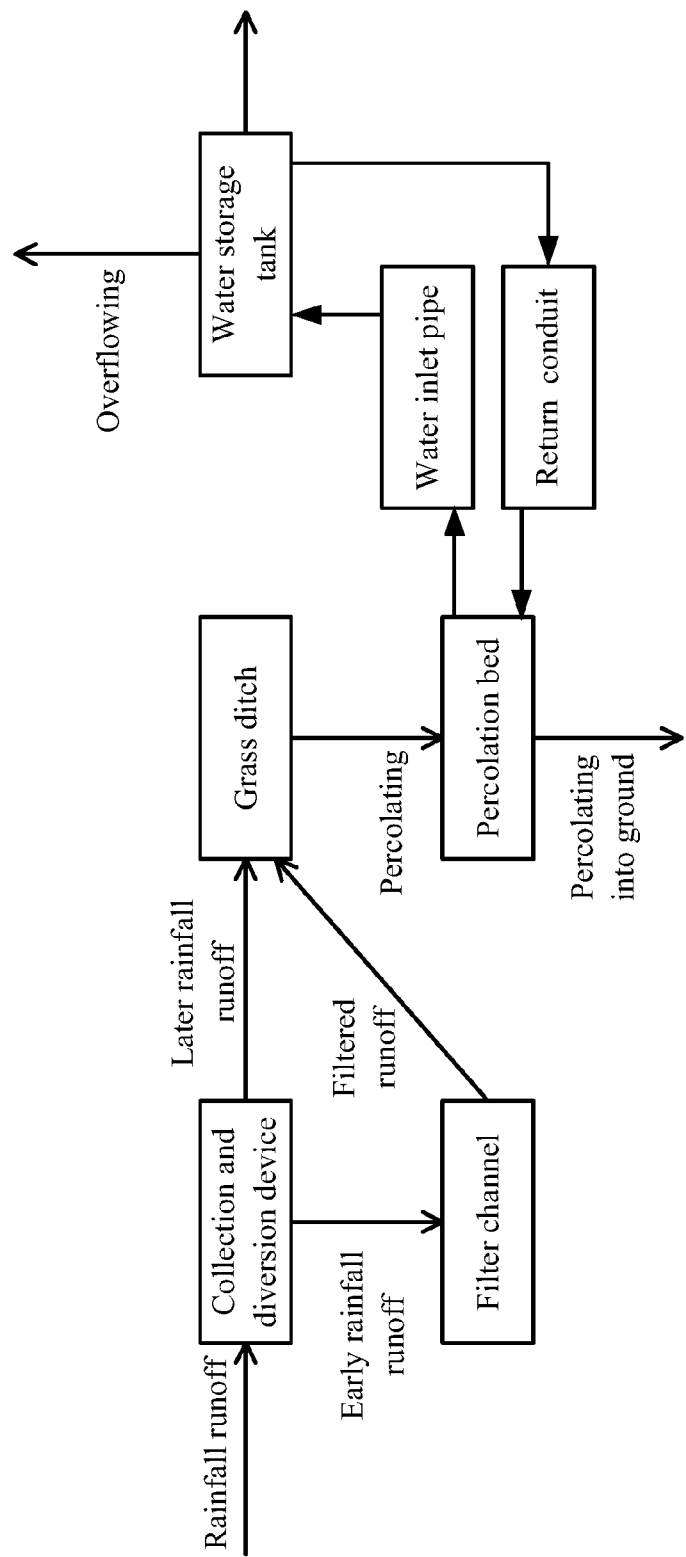
FIG. 1 is a flow diagram of a system for purifying rainfall runoff in accordance with one embodiment of the invention.
Figure 2:
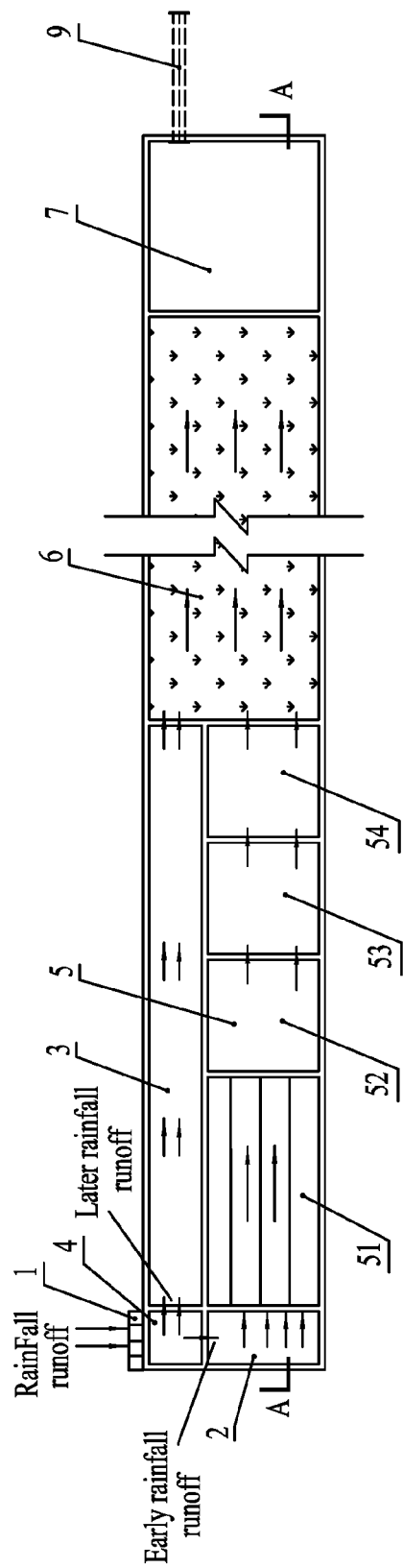
FIG. 2 is a structural diagram of a system for purifying rainfall runoff in accordance with one embodiment of the invention.
Figure 3:
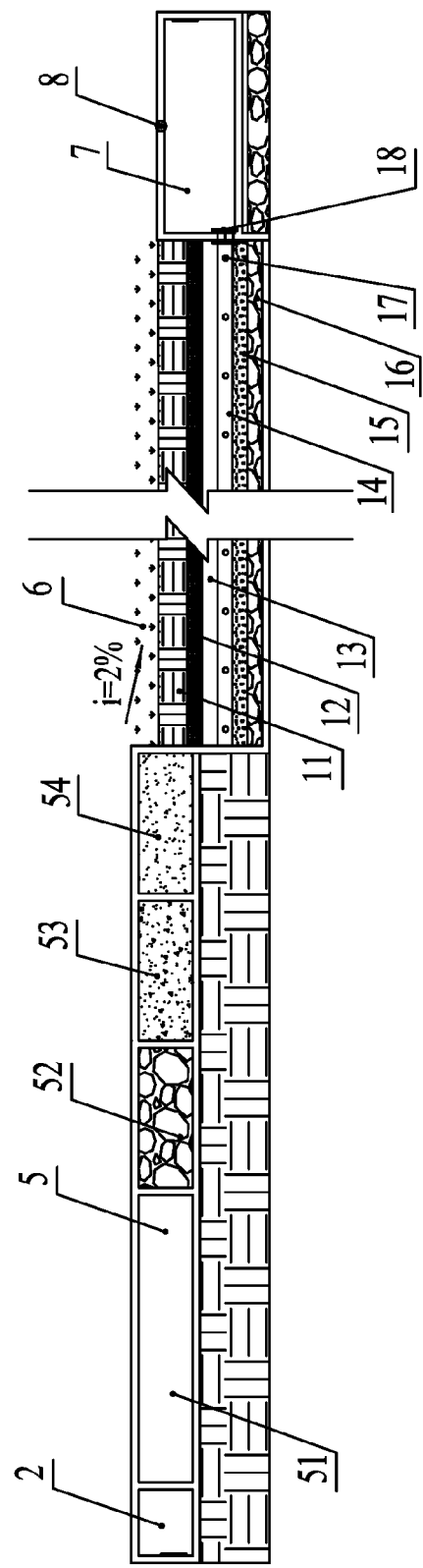
FIG. 3 is a cross-section view of a system for purifying rainfall runoff in accordance with one embodiment of the invention.

In the drawings; the following reference numbers are used: 1. Bar screen; 11. Soil of the percolation bed; 12. Crushed stone of the percolation bed; 13. Fine gravel of the percolation bed; 14 Pebbles of the percolation bed; 15. Slag of the percolation bed; 16. Geotextile of the percolation bed; 17. Coarse gravel of the percolation bed; 18. Guiding pipe; 2. First diversion canal; 3. Second diversion canal; 4. Collection and diversion device; 5. Filter channel; 51. Precipitation region; 52. Crushed stone; 53. Coarse sand; 54. Fine sand; 6. Grass ditch; 7. Water storage tank; 8. Overflow opening; and 9. Water outlet pipe.

DETAILED DESCRIPTION OF THE EMBODIMENTS

To further illustrate the invention, experiments detailing a system and method for purifying road runoff water are described below. It should be noted that the following examples are intended to describe and not to limit the invention.

A system for purifying road runoff water, the system comprises: a bar screen; a collection and diversion device; a filter channel; a grass ditch; a water storage tank.

The bar screen is disposed around the collection and diversion device for preliminarily filtering the road rainfall runoff. The collection and diversion device is used to collect and divert an early rainfall runoff and a later rainfall runoff to different flow directions. The road rainfall runoff is introduced to the collection and diversion device from the bar screen. The collection and diversion device discards between 1.5 and 2 mm of the road rainfall runoff. The discarded part of rainfall runoff is introduced to the filter channel by a first diversion canal, and the later rainfall runoff is introduced to the grass ditch by a second diversion canal. The first diversion canal is arranged at a front end of the filter channel, and the second diversion canal is arranged at one side of the filter channel. An area of a flow cross section of the second diversion canal is determined by a designed flow of the grass ditch.

The filter channel is arranged in front of the grass ditch. The filter channel comprises: a precipitation region and a filter region. A scale height of a bottom of the filter channel is equal to a scale height of a bottom of the grass ditch, and a size of the filter channel is determined by characteristics of the pollutants in the rainfall runoff in surrounding roads. The precipitation region is a horizontal flow sedimentation tank. The filtration region is provided with crushed stone, coarse sand, and fine sand, respectively. Different matrix materials are separated by using gratings and geotextiles, and pollutants in the early rainfall runoff is further intercepted and absorbed. The filter channel has a slope which is designed in accordance with a terrain. A scale height of a water outlet end of the filter channel is approximately equal to a scale height of a water inlet of the grass ditch.

The grass ditch is reconstructed from a green area in a central road or a green area on a road side, a length of the grass ditch is between 30 and 60 m. The grass ditch has a slope designed in accordance with the terrain, and a top of the scale length of the grass ditch is lower than that of the road. Soil on a bottom of the grass ditch is reconstructed to form a subsurface percolation bed. The percolation bed has a slope of 2%, and comprises one or several natural matrix materials including but not limited to soil, crushed stone, fine gravel, pebbles, slag, geotextile, and coarse gravel, and a thickness and material species of the percolation bed are determined by an objective and species of the pollutants to be controlled and water quality and quantity of the road runoff water. The guiding pipe of the percolation bed is connected to a connection pipe of the water storage tank. The guiding pipe is a perforated pipe. A water inlet of the perforated pipe is provided with a filter mesh, and a scale height of a bottom of the guiding pipe is higher than that of the bottom of the water storage tank.

The water storage tank is a permeation storage tank having a capacity determined by a designed water flow, an infiltration capacity of the grass ditch, and an infiltration capacity of the percolation bed. The water storage tank comprises: an overflow opening, a water outlet pipe, and a water inlet pipe. The overflow opening is arranged on a top of the water storage tank. A water outlet pipe is arranged at a position lower than the overflow opening and is connected to a next filter channel-grass ditch unit. The water inlet pipe is arranged at a position close to a bottom (between 10 and 20 cm higher than the bottom) of the water storage tank and is connected to the guiding pipe of the percolation bed. A pebble layer is laid over the bottom of the water storage tank.

The invention further provides a method for purifying road runoff water using the above mentioned system. The method comprises: 1) filtering the road rainfall runoff by the bar screen; 2) collecting the road rainfall runoff by the collection and diversion device, diverting the early rainfall runoff to the filter channel until the filter channel is full and diverting later rainfall runoff directly to the grass ditch via the open channels; 3) treating the early rainfall runoff and the later rainfall runoff by the grass ditch; 4) allowing the rainfall runoff effusing out of the grass ditch to flow into the water storage tank via the guiding pipe; and 5) transporting part of the rainfall runoff received by the water storage to the percolation bed by a return conduit, and allowing the rest rainfall runoff to overflow to a next purification system.

Unless otherwise indicated, the numerical ranges involved in the invention include the end values.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A system for purifying rainfall runoff comprising an early rainfall runoff and a later rainfall runoff, the system comprising:

a) a bar screen;
b) a collection and diversion device comprising a first side, a second side and a third side;
c) a filter channel;
d) a grass ditch comprising a percolation bed;
e) a water storage tank;
f) a first diversion canal;
g) a second diversion canal; and
h) a return conduit;

wherein:
the first side is disposed adjacent to the bar screen;
the collection and diversion device is adapted to receive the rainfall runoff via the bar screen and the first side;
the second side is substantially in parallel with the first side;
the third side is substantially perpendicular to the first side and the second side;
the second side is connected to the first diversion canal for directing the early rainfall runoff into the first diversion canal and then into the filter channel via the first diversion canal;
the filter channel is connected between the first diversion canal and the grass ditch for filtering the early rainfall runoff into a filtered rainfall runoff and transporting the filtered rainfall runoff to the grass ditch;
the third side is connected to the second diversion canal for diverting the later rainfall runoff to the second diversion canal after the filter channel is full;
the second diversion canal is connected to the grass ditch for transporting the later rainfall runoff into the grass ditch;
the water storage tank is connected to the grass ditch via a guiding pipe, to receive the rainfall runoff effusing out of the grass ditch; and
the return conduit is disposed between the water storage tank and the percolation bed.

2. The system of claim 1, wherein
the filter channel comprises a precipitation region and a filtration region, and a scale height of a bottom of the filter channel is equal to a scale height of a bottom of the grass ditch;
the filtration region is divided into a plurality of sections, each of the plurality of sections is filled with a matrix material, the matrix material in each one of the plurality of sections is different from that in another one of the plurality of sections, and the matrix material comprises crushed stone, coarse sand, or fine sand; and
each one of the plurality of sections is separated from another one of the plurality of sections by using gratings and geotextiles.

3. The system of claim 1, wherein
a length of the grass ditch is between 30 and 60 m;
the grass ditch has a slope, a top of a scale height of the grass ditch is lower than that of the road; and
the percolation bed is disposed below the grass ditch.

4. The system of claim 3, wherein the percolation bed comprises soil, crushed stone, fine gravel, pebbles, slag, geotextile, and coarse gravel.

5. The system of claim 1, wherein
the water storage tank is a permeation storage tank, and comprises: an overflow opening, a water outlet pipe, and a water inlet pipe;
the overflow opening is arranged on a top of the water storage tank;
the water outlet pipe is arranged at a position lower than the overflow opening;
the water inlet pipe is arranged at a position close to a bottom of the water storage tank and is connected to the guiding pipe of the percolation bed; and
a pebble layer is laid over the bottom of the water storage tank.

6. The system of claim 5, wherein
the guiding pipe comprises a plurality of pores and the guiding pipe is wrapped by geotextile; and
a scale height of a bottom of the guiding pipe is higher that than that of the bottom of the water storage tank.

7. A method for purifying rainfall runoff using a purification system, the purification system comprising
a) a bar screen,
b) a collection and diversion device comprising a first side, a second side, and a third side,
c) a filter channel,
d) a grass ditch comprising a percolation bed,
e) a water storage tank,
f) a first diversion canal,
g) a second diversion canal, and
h) a return conduit;

wherein:
the first side is disposed adjacent to the bar screen;
the second side is substantially in parallel with the first side;
the third side is substantially perpendicular to the first side and the second side;
the second side is connected to the first diversion canal;
the filter channel is connected between the first diversion canal and the grass ditch;
the third side is connected to the second diversion canal;
the second diversion canal is connected to the grass ditch;
the water storage tank is connected to the grass ditch via a guiding; pipe; and
the return conduit is disposed between the water storage tank and the percolation bed;

the method comprising:
1) filtering the rainfall runoff by the bar screen;
2) collecting the rainfall runoff by the collection and diversion device via the bar screen and the first side, diverting an early rainfall runoff to the first diversion canal via the second side and then to the grass ditch via the filter channel until the filter channel is full and diverting a later rainfall runoff via the third side to the second diversion canal and then to the grass ditch;
3) treating the early rainfall runoff and the later rainfall runoff by the grass ditch;
4) allowing the rainfall runoff effusing out of the grass ditch to flow into the water storage tank via the guiding pipe; and
5) transporting part of the rainfall runoff received by the water storage tank back to the percolation bed by the return conduit.

* * * * *